(12) United States Patent
Ottinger

(10) Patent No.: US 6,202,137 B1
(45) Date of Patent: *Mar. 13, 2001

(54) METHOD AND APPARATUS OF ARBITRATING REQUESTS TO A MULTI-BANKED MEMORY USING BANK SELECTS

(75) Inventor: James M. Ottinger, Duluth, GA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,521

(22) Filed: Sep. 18, 1997

(51) Int. Cl.[7] .................................................. G06F 12/00
(52) U.S. Cl. ..................... 711/168; 711/150; 711/151; 711/147; 710/240; 710/244; 710/241
(58) Field of Search ..................................... 711/168, 150, 711/151, 147, 149; 395/827, 856, 859, 860, 728, 729, 730, 731, 732

(56) References Cited

U.S. PATENT DOCUMENTS

| | | | |
|---|---|---|---|
| 4,796,232 | * 1/1989 | House | 365/189 |
| 5,220,653 | * 6/1993 | Miro | 395/275 |
| 5,398,211 | 3/1995 | Willenz et al. | 365/230.05 |
| 5,412,788 | 5/1995 | Collins et al. | 395/425 |
| 5,426,765 | 6/1995 | Stevens et al. | 395/425 |
| 5,440,713 | * 8/1995 | Lin | 395/485 |
| 5,509,136 | * 4/1996 | Korekata et al. | 395/478 |
| 5,530,838 | 6/1996 | Hisano | 395/478 |
| 5,555,382 | 9/1996 | Thaller et al. | 395/293 |
| 5,784,582 | * 7/1998 | Hughes | 395/496 |
| 5,832,304 | * 11/1998 | Bauman et al. | 395/860 |

* cited by examiner

Primary Examiner—Eddie P. Chan
Assistant Examiner—Kimberly McLean
(74) Attorney, Agent, or Firm—Ray Werner

(57) ABSTRACT

A present request includes a present bank select that maps the present request to one bank of a memory having multiple banks. A first request includes a first bank select that maps the first request to one bank of the memory, and a second request includes a second bank select that maps the second request to one bank of the memory. A method of arbitrating requests to the memory includes the steps of (a) processing a present request to access the memory; (b) receiving a first request to access the memory and a second request to access the memory; (c) selecting from the first request and the second request, a next request to access the memory; and (d) processing the next request to access the memory. Furthermore, the selecting step of the method is dependent upon the present bank select, the first bank select, and the second bank select. A memory controller and a computer system which implement the method of arbitrating requests is also disclosed.

18 Claims, 4 Drawing Sheets

METHOD AND APPARATUS OF ARBITRATING REQUESTS TO A MULTI-BANKED MEMORY USING BANK SELECTS

BACKGROUND OF THE INVENTION

The present invention relates generally to memory arbitration schemes, and more particularly to a method and apparatus of arbitrating requests to a memory having more than one bank.

In response to consumer demand for high performance computer systems, manufacturers are developing computer systems that utilize multiple processors, instead of a single processor. The theory behind multi-processor systems is that if a one processor system provides a certain level of performance, then a two processor system could provide twice the performance of the one processor system, and a three processor system could provide three times the performance of the one processor system, etc. While in theory this may be true, the reality is that, due to various limiting factors, each additional processor that is added to a computer system only increases the performance by a fraction. As a result, a particular two processor system may only provide 1.5 times the performance of a one processor system.

One such performance limiting factor is that, these multi-processor systems typically have a common or shared memory resource in which the processors store and retrieve instructions and data. In these systems, the processors typically access the shared memory by issuing, upon a processor bus, memory requests to a memory controller. The memory controller decodes the request and then satisfies the request by controlling the transfer of information (instructions or data) between the processor and the shared memory in accordance with the type of request. However, since these multi-processor systems are typically designed such that only a single request may access the shared memory at a given time, an arbitration scheme must be implemented which grants a single request access to the shared memory.

Since these processors do not have exclusive use of the memory, at times a first processor must wait for a second processor's request to complete before the first processor's request can be satisfied. This performance limiting factor of waiting for another processor's request to complete is even further aggravated by the fact that due to physical characteristics of the shared memory certain memory accesses take longer than others. Since in the typical case, a memory controller has more than one memory request from which to select a request to process, a memory controller, which makes an informed decision as to which memory request to select, can increase the performance of the multi-processor system by reducing the amount of time that the processors, as a whole, are waiting for requests.

What is needed therefore, is a method and apparatus of arbitrating requests to a multi-banked memory which increases the performance of a computer system by reducing the amount of time that the processors, as a whole, wait for memory requests to be completed.

SUMMARY OF THE INVENTION

In accordance with one embodiment of the present invention, there is provided a method of arbitrating requests to a memory having multiple banks. The method includes the steps of (a) processing a present request to access the memory; (b) receiving a first request to access the memory and a second request to access the memory; (c) selecting from the first request and the second request, a next request to access the memory; and (d) processing the next request to access the memory. The present request includes a present bank select that maps the present request to one of the banks, the first request includes a first bank select that maps the first request to one of the banks, and the second request includes a second bank select that maps the second request to one of the banks. Furthermore, the selecting step of the method is dependent upon the present bank select, the first bank select, and the second bank select.

Pursuant to another embodiment of the present invention, there is provided a memory controller for arbitrating requests to access a memory having a number of banks. The memory controller includes a first queue, a second queue, a present bank store, and an arbiter. The first queue has at least one storage element configured to store a first request to access said memory. The first request includes a first bank select that maps said first request to one of the banks. The second queue has at least one storage element configured to store a second request to access said memory. The second request includes a second bank select that maps the second request to one of the banks. The present bank store has at least one storage element configured to store a present bank select of a present bank request that has been granted access to the memory. The present bank select maps the present request to one of the banks. The arbiter is coupled to the first queue, the second queue, and the present bank store. The arbiter grants access to the memory to a next request that is selected from the first request and the second request depending upon the first bank select, the second bank select, and the present bank select.

Pursuant to yet another embodiment of the invention, there is provided a computer system. The computer system includes a memory, a memory controller, a first group of processors, and second group of processors. The memory includes a number of banks that are identified by a number of bank identifiers wherein each bank has a separate bank identifier. The memory controller is coupled to the memory and includes a first port, a second port, and an arbiter. The first group of processors include at least one processor and each processor of the first group of processors is coupled to the first port of the memory controller via a first bus. The second group of processors includes at least one processor and each processor of the second group of processors is coupled to the second port of the memory controller via a second bus. Furthermore, the arbiter grants access to the memory to a next request that is selected from a first request received from the first group of processors and a second request received from the second group of processors. The arbiter selects the next request dependent upon (1) a first bank select of the first request, (2) a second bank select of the second request, and (3) a present bank select of a present request that has been granted access to the memory. The first bank select corresponds to one of the bank identifiers, the second bank select corresponds to one of the bank identifiers, and the present bank select corresponds to one of the bank identifiers.

It is an object of the present invention to provide an improved method and apparatus for arbitrating memory requests.

It is a further object of the present invention to provide a method and apparatus for arbitrating requests which increases system performance by reducing the overall time the system spends on waiting for requests to memory to be processed.

It is yet another object of the present invention to provide a method and apparatus for arbitrating requests which are effective in a computer system having only a few requesting agents.

It is also an object of the present invention to provide a method and apparatus for arbitrating requests which are effective in a computer system having many requesting agents.

The above and other objects, features, and advantages of the present invention will become apparent from the following description and the attached drawings.

DETAILED DESCRIPTION OF THE PREFERRED EMBODIMENT

Figure 1:
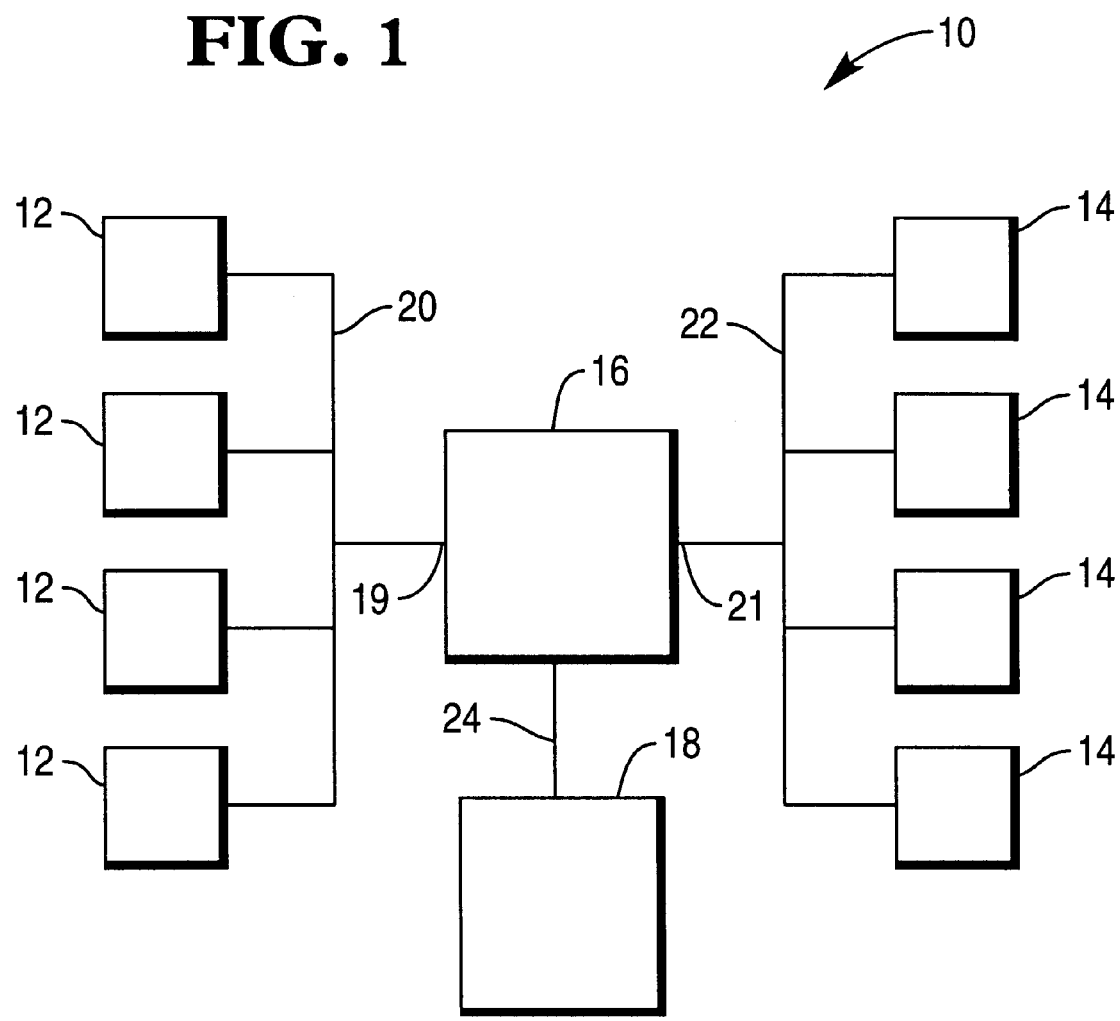
FIG. 1 shows a computer system which incorporates various features of the present invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

In FIG. 1, there is shown a computer system 10 which includes a first group of requesting agents 12, a second group of requesting agents 14, a memory controller 16, and a shared memory 18. Requesting agents 12 are coupled to a port 19 of the memory controller 16 via a bus 20, requesting agents 14 are coupled to a port 21 of the memory controller 16 via a bus 22, and the memory controller 16 is coupled to the memory 18 via memory bus 24.

The requesting agents 12 and 14 may be any number of computer devices such as processors, disk drives, video adapters, network cards, etc., which may need access to the memory 18. However, in a preferred embodiment the requesting agents 12 and 14 are Intel Pentium Pro (P6) processors and/or Intel Orion PCI Bridges (OPB), and the buses 20 and 22 which couple the requesting agents 12 and 14 to the memory controller 16 are each a Pentium Pro (P6) bus.

Figure 2:
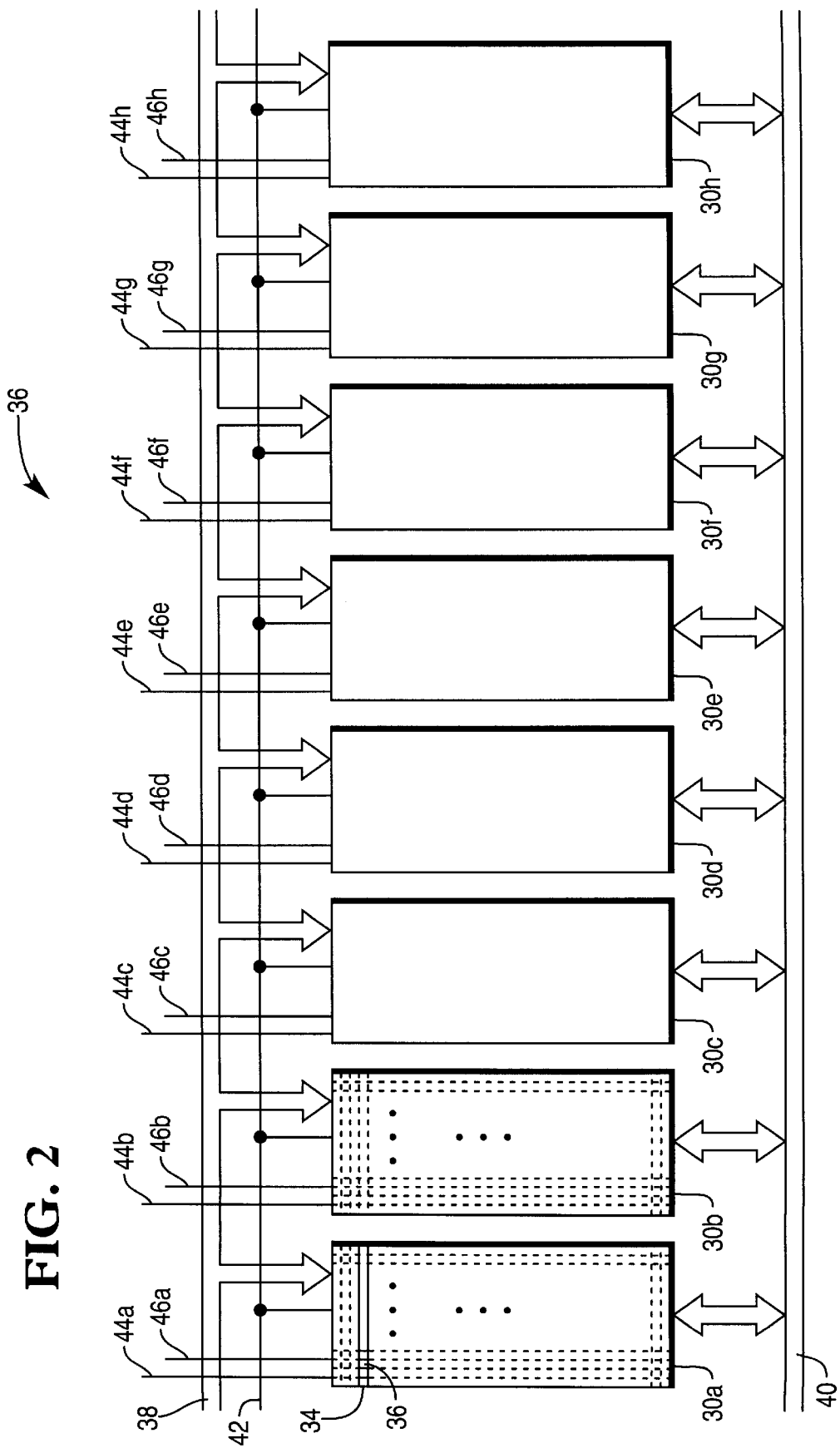
FIG. 2 shows the multi-bank configuration of the memory of FIG. 1.

In FIG. 2, there is shown a block diagram which depicts the multiple bank (multi-bank) configuration of the memory 18 and the various data, address, and control lines of the memory bus 24. In a preferred embodiment, the memory 18 is made up of eight banks 30a–30h of DRAM (dynamic random access memory). Each bank 30a–30h includes several pages 34 that are each identified by a separate row address. Furthermore, each page 34 of the bank includes several addressable units 36 that are each identified by a separate column address.

Each bank 30a–30h is further coupled to an address bus 38, a data bus 40, and a write enable line 42. The address bus 38 includes several conductors or lines which carry row addresses and column addresses from the memory controller 16 to the memory 18. Likewise, the data bus 40 includes several conductors or lines which carry information (data and/or instructions) to and from the memory controller 16 and the memory 18. The write enable line 42, when activated, configures the banks 30a–30h for storing information on the data bus 40 into an addressable unit 36 of the memory 18.

Furthermore, each bank 30a–30h is also coupled to a separate row address strobe (RAS) line 44a–44h and a separate column address strobe (CAS) line 46a–46h. The RAS lines 44a–44h are used for selecting pages 34 of the memory 18 by strobing a row address into the respective banks 30a–30h of the memory 18, and the CAS lines 46a–46h are used for selecting addressable units 36 of selected pages 34 by strobing a column address into the respective banks 30a–30h of the memory 18. Therefore, an addressable unit 36 of the bank 30a is identified by a row address, a page address, and a strobing of the RAS line 44a and the CAS line 46a.

In a preferred embodiment, each bank 30a–30h includes several memory modules or chips which in combination hold 128 MB (1 MB=1 Megabyte=$2^{20}$ bytes) in 2 K (1 K=$2^{10}$) pages. Furthermore, each page, in a preferred embodiment, contains 2K addressable units 36, and each addressable unit 36 contains 32 bytes. However, it should be appreciated that the above numbers are only offered for illustrative purposes and that the present invention is not limited to this specific example.

In order to better appreciate the function of the various control lines and the utility of the invention, the processing of exemplary memory requests will be discussed. For example, if the memory controller 16 decides to process a read request that requests information stored in an addressable unit 36 of the bank 30a, the memory controller 16 first determines from a bank select of the read request that the requested information is stored in the bank 30a. Then, the memory controller 16 places upon the address bus 38 the row address for the page 34 in which the requested information is stored and asserts the RAS line 44a for the bank 30a which selects the appropriate page 34 of the memory 18. The memory controller 16 then places upon the address bus 38 the column address for the addressable unit 36 and asserts the CAS line 46a for the bank 30a which places the information stored in the addressable unit 36 upon the data bus 40. The memory controller 16 takes the information from the data bus 40 and transfers the information to the appropriate requesting agent 12 or 14.

Similarly, if the memory controller 16 decides to process a write request to store information in an addressable unit 36 of the bank 30a, the memory controller 16 first determines from a bank select of the write request that the information is stored to be stored in the bank 30a. Then, the memory controller 16 places upon the address bus 38 the row address for the page 34 in which the requested information is to be stored and asserts the RAS line 44a for the bank 30a which selects the appropriate page 34 of the memory 18. The memory controller 16 then places the information to be stored upon the data bus 40 and asserts the write enable line 42. Finally, the memory controller 16 places upon the address bus 38 the column address for the addressable unit 36 and asserts the CAS line 46a for the bank 30a which causes the information to be stored in the addressable unit 36 identified by the column address.

Three types of memory requests are possible. In order to better understand the following descriptions of request types the term "present request" needs to be defined. A present request is a request that is currently accessing the memory 18 in order to obtain or store information. As should be appreciated, since the memory 18 can only be accessed by one request at a time, there is up to one present request at a given time; however, if no request is accessing the memory 18 at a given period of time, then there is no present request at that period of time.

The first type of memory request is a page hit request. A page hit request is a request that maps to the same page 34 of memory 18 that is presently being accessed by the present request. A page hit request is the most efficient type of memory request to process since the correct page 34 is already selected. As a result, the memory controller 16 does not need to place a new row address upon the address bus 38 and re-assert one of the RAS lines 44a–44h. Instead, the memory controller 16 only needs to place the new column address upon the address bus 38 and re-assert one of the CAS lines 46a–46h in order to select the appropriate addressable unit 36.

The second most efficient type of memory request to process is a bank miss request. A bank miss request is a request that maps to a bank 30a–30h of the memory 18 that is different than the bank 30a–30h that is presently being accessed by the present request. When processing a bank miss request, the memory controller 16 in order to select the appropriate page 34 must place the row address upon the address bus 38 shortly after the present request is completed and must assert one of the RAS lines 44a–44h. The memory controller 16 then must place the column address upon the address bus 38 and must assert one of the CAS lines 46a–46h in order to select the appropriate addressable unit 36.

The least efficient type of memory request to process is a bank hit-page miss request. Using a bank miss request as a base line request, a bank hit-page miss request generally carries a performance penalty equal to or greater than the performance gain of the page hit request. A bank hit-page miss request is a request that maps to the same bank 30a–30h that is currently being accessed by the present request but addresses a page 34 of the bank 30a–30h that is different than the page 34 being accessed by the present request.

When processing a bank hit-page miss request, the memory controller 16 must wait for the present request to complete and must wait for a RAS pre-charge period before placing the row address upon the address bus 38 and re-asserting the appropriate RAS line 44a–44h. The memory controller 16 must wait because the present request does not de-assert the RAS line 44a–44h for the appropriate bank 30a–30h until just before the present request is complete. Therefore, the memory controller 16 must wait for the asserted RAS line 44a–44h to enter a de-asserted state which requires the RAS line 44a–44h to pre-charge. Only when the previously asserted RAS line 44a–44h has completed its pre-charge may the memory controller 16 re-assert the RAS line 44a–44h with the new address upon the address bus 38 to select the correct page 34 of the memory 18. The memory controller 16 may then place the column address upon the address bus 38 and assert the appropriate CAS line 46a–46h.

It should be appreciated that if there is no present request accessing a bank 30a–30h of the memory 18, then a request can be viewed as a bank miss request. The request may be viewed as a bank miss request because the memory controller 16 will need to select a page 34 and an addressable unit 36 but will not need to wait for the RAS lines 44a–44h to enter the de-asserted state before selecting the page 34.

Furthermore, the percentage breakup of the three types of memory requests is dependent upon a number of factors such as the number of banks 30a–30h, the number of requesting agents 12 and 14, the size of the processor caches, the size of the pages 34, and the work load of the computer system 10. Generally, if the computer system 10 has a small number of requesting agents 12 and 14, the computer system 10 will have a higher percentage of page hit requests than if the computer system 10 has a large number of requesting agents 12 and 14.

Figure 3:
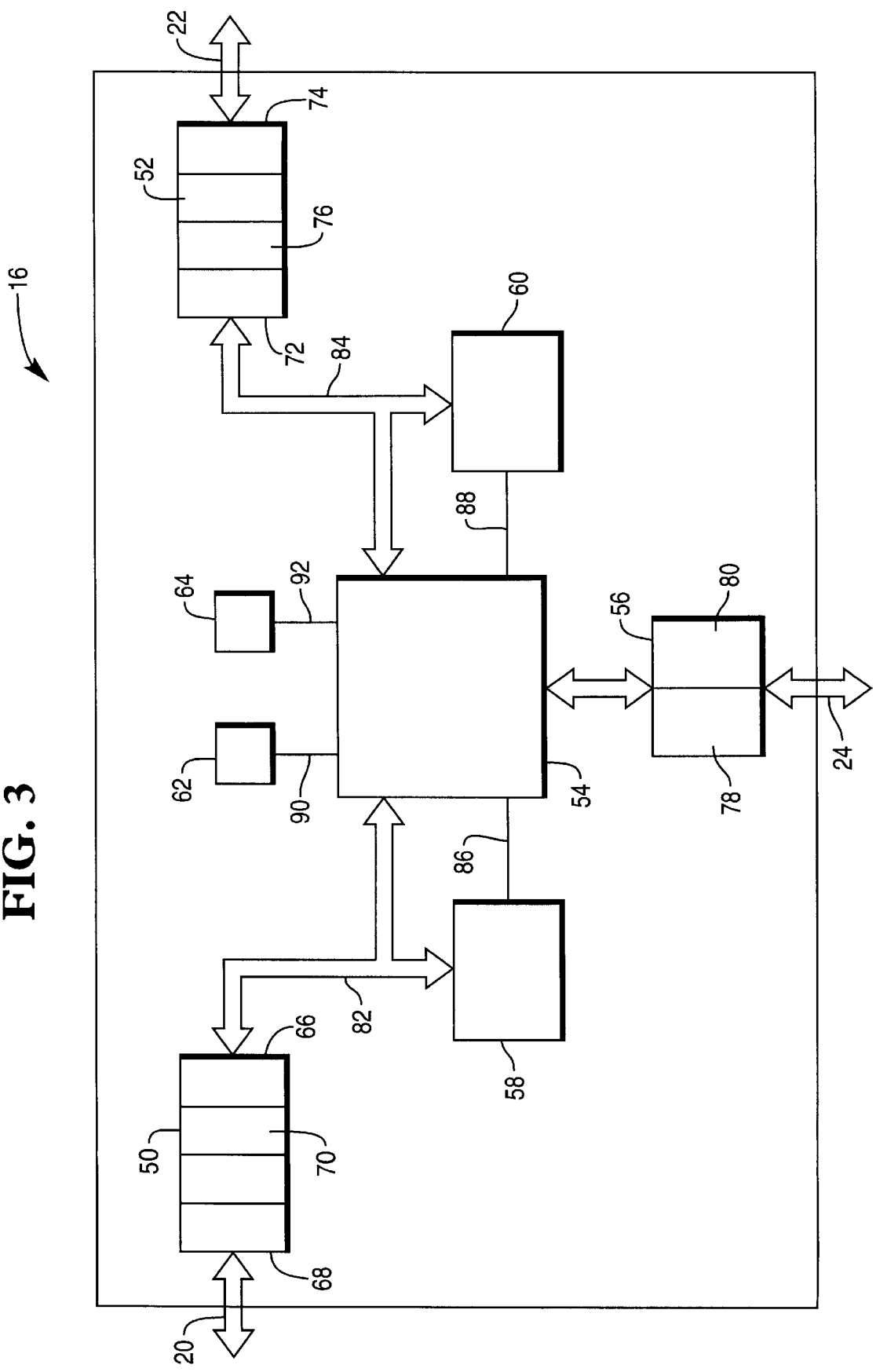
FIG. 3 shows a block diagram of the memory controller of FIG. 1.

In FIG. 3 there is shown a block diagram of the memory controller 16 which incorporates various features of the present invention. The memory controller 16 includes a first request queue 50, a second request queue 52, an arbiter 54, a memory interface 56, a first bank hit generator 58, a second bank hit generator 60, a present bus flag 62, and a mode flag 64.

The first request queue 50 receives and stores memory requests from the requesting agents 12 that are coupled to the bus 20, and the second request queue 52 receives and stores memory requests from the requesting agents 14 that are coupled to the bus 22. The queue 50 and the queue 52 each have at least one storage element 70 and 76 for storing requests. Furthermore, in a preferred embodiment, the queue 50 is implemented as a FIFO (first in first out) queue having a head 66, a tail 68, and several storage elements 70, and the queue 52 is implemented as a FIFO queue having a head 72, a tail 74, and several storage elements 76. Generally, requests enter the FIFO queues 50 and 52 at the tails 68 and 74 and later exit the FIFO queues 50 and 52 at the heads 66 and 72. Therefore, by implementing the first request queue 50 and the second request queue 52 as FIFO queues, requests received by each individual queue 50 and 52 are processed in the same order as the requests are received by the respective queues 50 and 52.

The memory interface 56 controls the transfer of information between the memory controller 16 and the memory 18 in accordance with memory requests received from the arbiter 54. In a preferred embodiment, the memory interface 56 contains two controllers 78 and 80 for processing memory requests. As a result of having two controllers 78 and 80, the memory interface 56 may process a present request while concurrently receiving a next request to process. Therefore, in operation, the two controllers 78 and 80 generally alternate between processing a present request and receiving a next request.

The arbiter 54 essentially determines to which request to grant access to the memory 18 and once determined sends the granted request to the memory interface 56 for processing. In a preferred embodiment, the arbiter 54 first grants accesses to memory requests which will alleviate certain critical conditions such as a queue 50 or 52 being nearly full. However, if such a critical condition is not present, the arbiter 54 attempts to grant access to the memory 18 in a manner which will efficiently process the requests that are stored in the queues 50 and 52. In particular, the arbiter 54 grants access to either a request at the head 66 of the first request queue 50 or a request at the head 72 of the second request queue 52. In granting access, the arbiter 54 attempts to select from the requests at the heads 66 and 72 of queues 50 and 52 a next request for processing which will take the least amount of time to process. Since the amount of time required to process a request is dependent upon the type of request, the arbiter 54 must determine the request type for each request at the heads 66 and 72 of the queues 50 and 52 if the arbiter 54 is to efficiently grant access to the memory 18.

The arbiter 54 of a preferred embodiment uses various information for determining the type of request for each request that is at the heads 66 and 72. In particular, the arbiter 54 uses information supplied by the first bank hit generator 58, the second bank hit generator 60, the present bus flag 62, and the mode flag 64.

The first bank hit generator 58 determines whether the request at the head 66 of queue 50 is a bank hit request. In other words, the first bank hit generator 58 determines whether the request maps to the same bank as the present request. Likewise, the second bank hit generator 60 determines whether the request at the head 72 of the queue 52 is a bank hit request. The first bank hit generator 58 receives from the bus 82 the bank select of the request at the head 66 of queue 50, and the second bank hit generator 60 receives from the bus 84 the bank select of the request at the head 72 of queue 52.

In the preferred embodiment, the computer system 10 has eight banks and only one bank of the eight banks may be accessed or enabled at a time. As a result, the bank select in the preferred embodiment is implemented as an eight bit value in which all bits have a logical zero ("0") value except for one bit which has a logical one ("1") value. The position of this one bit in the bank select indicates to which of the eight banks the request maps.

It should be appreciated that the requests which were initially generated by the requesting agents 12 and 14 probably did not contain a bank select having the above property. However, mapping an initial request to a request that includes a row address, a column address, and a bank select with the above described properties is well known in the art. Furthermore, in the preferred embodiment, this mapping of the initial request to a request that includes a bank select occurs prior to storing the request in the queues 50 and 52.

If the bank select of the request at the head 66 of queue 50 indicates that the request maps to the same bank as the present request, the first bank hit generator 58 transmits a hit signal to the arbiter 54 by asserting the bank hit line 86. However, if the bank select of the request at the head 66 of queue 50 indicates that the request maps to a different bank than the present request, then the first bank hit generator 58 transmits a miss signal to the arbiter 54 by de-asserting the bank hit line 86. Likewise, if the bank select of the request at the head 72 of queue 52 indicates that the request maps to the same bank as the present request, the second bank hit generator 60 transmits a hit signal to the arbiter 54 by asserting a bank hit line 88. However, if the bank select of the request at the head 72 of queue 52 indicates that the request maps to a different bank than the present request, then the second bank hit generator 60 transmits a miss signal to the arbiter 54 by de-asserting the bank hit line 88.

As should be apparent from the above description of the three request types, if a request is a bank hit request (a request that maps to the same bank 30a–30h as the present request), then the request may be either a page hit request or a bank hit-page miss request. However, if a request maps to a different bank 30a–30h than the present request, then the request is a bank miss request. Therefore, if a request maps to the same bank 30a–30h as a present request, the request may be either the most efficient type of request to process or the least efficient type of request to process, but if the request maps to a different bank 30a–30h than the present request, then the request is the second most efficient type of request to process.

As stated above, the processing of a bank hit-page miss request carries a performance penalty that is typically at least as large as the performance gain that results from processing a page hit request. Therefore, if a bank hit request is more likely to be a page hit request than a bank hit-page miss request, then the arbiter 54, when selecting between a bank hit request and a bank miss request, should select the bank hit request for the next request for processing instead of the bank miss request. However, if a bank hit request is less likely to be a page hit request than a bank hit-page miss request, the arbiter 54 when making the same selection, should select the bank miss request for the next request for processing instead of the bank hit request. The following examples, demonstrate why the arbiter 54 should make selections of next requests in the above manner.

For example, if processing a page hit takes 1 unit of time, processing a page miss takes 2 units of time, processing a bank hit-page miss takes 3 units of time, and the odds of a bank hit request (a page hit request or a bank hit-page miss request) being a page hit are 75 percent, then processing a bank hit request should take, on average, 1.5 units of time to process (1 unit×0.75+3 units×0.25=1.5 units). Therefore, when selecting between a bank hit request and a bank miss request, the arbiter 54 should grant access to the bank hit request because a bank hit request on average should take less time to process than the bank miss request (1.5 units<2 units).

However, if the odds of a page hit were only 25 percent, then processing a bank hit request should take, on average, 2.5 units of time to process (1 unit×0.25+3 units×0.75=2.5 units). Therefore, when selecting between a bank hit request and a bank miss request, the arbiter 54 should grant access to the bank miss request because a bank miss request on average should take less time to process than the bank hit request (2 units<2.5 units).

As stated above, several factors influence distribution of request types in the computer system 10. For example, the number of requesting agents 12 and 14 in the computer system 10 influences the distribution of request types in the computer system 10. This is a result of a property known as the locality of reference. The locality of reference property recognizes the fact that requesting agents typically address memory in such a manner that each new request from a requesting agent is likely to address an area of memory which the requesting agent has recently addressed in the past. However, while a first requesting agent is likely to reference areas of memory that the first requesting agent had recently referenced, a second requesting agent is not as likely to reference the same areas of memory as the first requesting agent. Therefore, the more requesting agents 12 and 14 the computer system 10 has the less likely that any one request will be a page hit.

The arbiter 54 of the present invention takes advantage of the above locality of reference property in two ways. This first way the arbiter 54 takes advantage of the above locality of reference property is by selecting requests for processing depending upon the number of requesting agents 12 and 14 in the computer system 10. For example, if computer system 10 has below a certain number of requesting agents 12 and 14, then the arbiter 54, when selecting between a bank hit request and a bank miss request, grants access to the bank hit request since the bank hit request is more likely a page hit request than a bank hit-page miss request. However, if the computer system 10 has more than a certain number of requesting agents 12 and 14, then the arbiter 54, when selecting between a bank hit request and a bank miss request, grants access to the bank miss request since the bank hit request is more likely a bank hit-page miss request than a page hit request.

In order to implement this first way of taking advantage of the locality of reference property, the memory controller 16 includes a mode flag 64 which is coupled to the arbiter 54 via line 92. In the preferred embodiment, the mode flag 64 may store one of two values which in turn places the memory controller 16 into one of two states. When the mode flag 64 is set to the first value, the memory controller 16 is placed into a small configuration state. The small configuration state indicates that the computer system 10 has a small enough number of requesting agents 12 and 14 that the odds of a bank hit request being a bank hit-page miss request are low enough that the arbiter 54 when selecting between a bank hit request and a bank miss request should select the bank hit request. When the mode flag 64 is set to the second state, the memory controller 16 is placed into a large configuration state. The large configuration state indicates that the computer system 10 has a large enough number of requesting agents 12 and 14 that the odds of a bank hit request being a bank hit-page miss request are high enough that the arbiter 54, when selecting between a bank hit request and a bank miss request, should select the bank miss request.

The mode flag 64 may be implemented in various different ways. For example, the mode flag 64 may be implemented with a single storage bit which may be set to one of two states when the memory controller 16 is initialized at system power-up. In other words, a startup routine, that is executed at power-up, may poll all requesting agents 12 and 14 connected to the memory controller 16 in order to determine the number of requesting agents 12 and 14 in the computer system 10. Then, the startup routine may set the mode flag 64 to a small configuration state if the number of requesting agents 12 and 14 is less than a certain threshold value and to a large configuration state if the number of requesting agents 12 and 14 is greater than or equal to the certain threshold value.

Alternatively, the mode flag 64 may be manually set by a user of the computer system 10 by setting a jumper, actuating a switch, or altering a value of an initialization file. Furthermore, the mode flag 64 may be implemented with an agent store and programmable threshold value. The agent store would store a value indicative of the number of requesting agents 12 and 14 that are coupled to the memory controller 16, and the threshold value would be a programmable value to which the value stored in the agent store is compared. If the agent store is greater than the threshold value, then the memory controller 16 operates in the large configuration state, and if the agent store is less than or equal to the threshold value, then the memory controller 16 operates in the small configuration state.

The second way the arbiter 54 takes advantage of the above locality of reference property is by selecting requests for processing depending upon which bus the memory controller 16 received the present request from. For example, if the present request was received via the bus 20, then a first bank hit request that was received via bus 20 is more likely a page hit request than a second bank hit request that was received via bus 22. The first bank hit request is more likely a page hit request than the second bank hit request is a page hit request because the first bank hit request and the present request may have been issued from the same requesting agent 12, but the second bank hit request and the present request could not have both been issued from the same requesting agent.

In order to implement this second way of taking advantage of the locality of reference property, the memory controller 16 includes the present bus flag 62 whose contents may be read and set by the arbiter 54 via line 90. The present bus flag 62 or present queue flag 62 tracks from which bus 20 and 22 or queue 50 and 52 the present request originated. Since in a preferred embodiment the queue 50 is coupled to bus 20 and the queue 52 is coupled to bus 22, each request issued on bus 20 is stored in the queue 50 and each request issued on bus 22 is stored in the queue 52. Therefore, tracking from which queue the present request originated is the same as tracking from which bus the present request originated.

Since, in a preferred embodiment, the memory controller 16 includes only two queues 50 and 52 or buses 20 and 22 that need to be tracked using the present bus flag 62, the present bus flag 62 may be implemented as a single control bit. The control bit may be set to a first state if the present request originated from the queue 50 and the bus 20 and may be set to a second state if the present request originated from the queue 52 and the bus 22.

Figure 4:
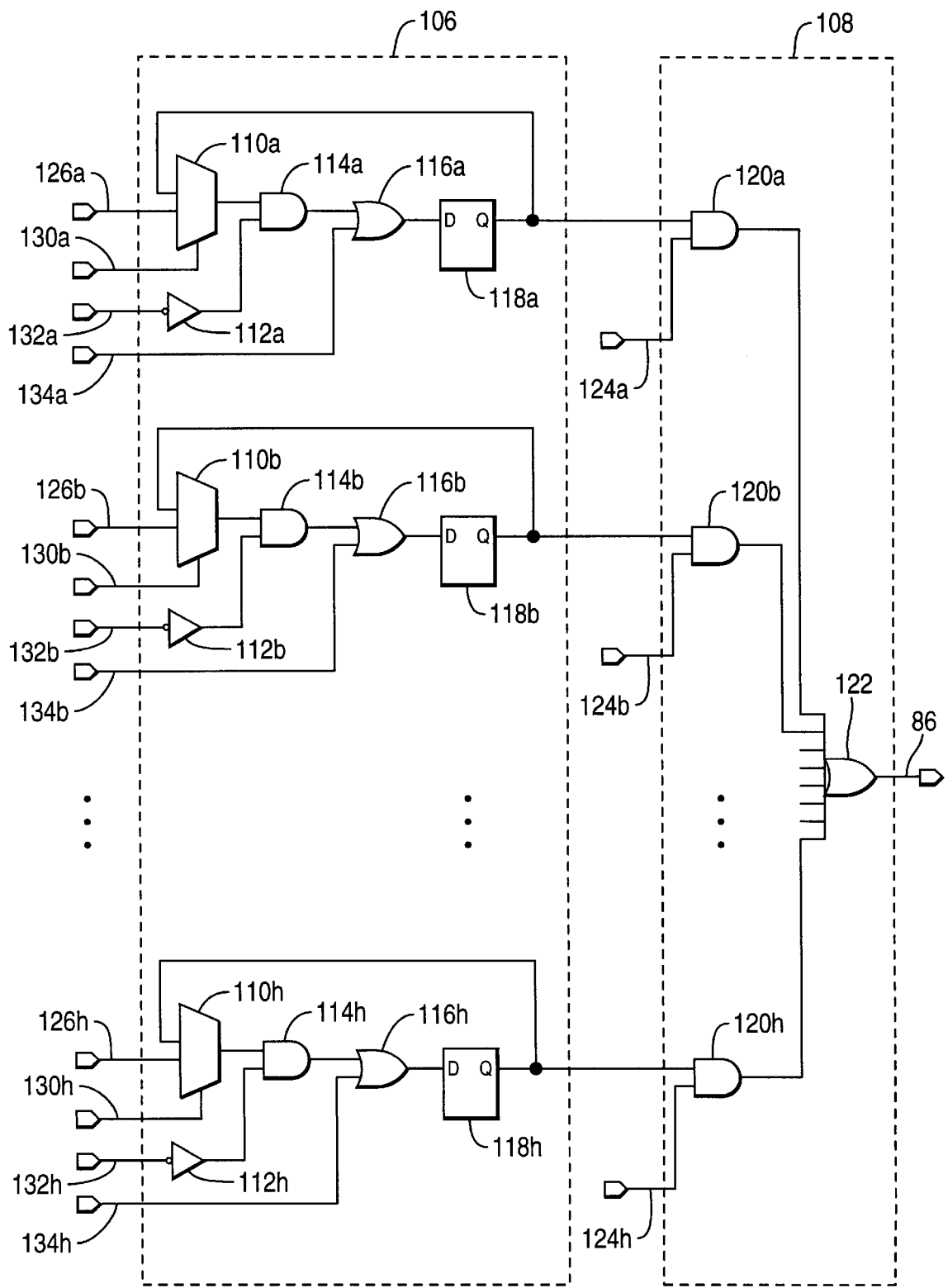
FIG. 4 shows a logic circuit for one of the bank hit generators of FIG. 3.

In FIG. 4, there is shown a logic circuit for implementing one of the bank hit generators 58 and 60. Since the hardware for the bank hit generators 58 and 60 are identical, only the hardware for the bank hit generator 58 will be discussed in detail. The bank hit generator 58 includes two main sections: a present bank store 106 for storing the bank select of the present request and a bank select comparator 108 for comparing the stored present bank select to the bank select of a request at the head 66 of the queue 50.

The present bank store 106 includes eight two-to-one multiplexers or muxes 110a–110h, eight inverters 112a–112h, eight two input AND gates 114a–114h, eight two input OR gates 116a–116h, and eight D flip-flops 118a–118h. The comparator 108 includes eight two input AND gates 120a–120h, and one eight input OR gate 122. To help simplify the discussion, only the hardware for one bit of the present bank store 106 will be discussed in detail since the hardware for the remaining seven bits is essentially identical. Furthermore, the operation of muxes, inverters, AND gates, OR gates, and flip-flops are well known in the art and will not be discussed in detail.

One input of the mux 110a receives the one bit 126a of the bank select of the present request that corresponds to the bank 30a. Furthermore, the other input of the mux 110a receives the non-inverting output of the D flip-flop 118a. Furthermore, a load line 130a is coupled to the select line of the mux 110a. When the load line 130a is at a logical "0," the output of the mux 110a is equal to the output of the D flip-flop 118a that is coupled to one input of the mux 110a. Likewise, when the load line 130a is at a logical "1," the output is equal to the value of the bank select bit 126a of the present request that is coupled to the other input of the mux 110a.

The input of the inverter is coupled to a close line 132a, and the output is coupled to an input of the AND gate 114a. The other input of the AND gate 114a is coupled to the output of the mux 110a. The output of the AND gate 114a is coupled to an input of the OR gate 116a. The other input of the OR gate 116a is coupled to a hold line 134a and the output of the OR gate is coupled to the D input of the flip-flip 118a.

The load lines 130a–130h are used to load and store the bank select for the present request. Assuming that the close lines 132a–132h all have a logical value of "0," the bank select for the present request will be clocked into the flip-flops 118a–118h when the load lines 130a–130h all have a logical value of "1" and the flip-flops 118a–118h will retain their values when the load line 130a–130h all have a logical value of "0."

The close lines 132a–132h are used by the controller 78 or 80 of the memory interface 56 that is processing the present request to inform the other controller 78 or 80 that it is done processing the present request and the RAS line 44a–44h for the present request will be de-asserted. For example, if controller 78 is processing a present request that is referencing bank 30b, the controller 78 asserts the close line 130b when done processing the present request. By asserting the close line 130b, the controller 80 is informed that the controller 78 will de-assert the RAS line 44b. Therefore, if the request the controller 80 will process as the next present request is a page hit request, the controller 80 may timely assert the hold line 134b to cause the RAS line 44b to remain asserted and to cause the proper bank select value to remain stored in the flip-flops 118a–118h. If the controller 80, however, fails to timely assert the hold line 134b, the flip-flops 118a–118h are cleared (i.e. a "0" value is stored in each flip-flop 118a–118h) and the RAS line 44b is de-asserted thereby requiring the controller 80 to process the request as a bank hit-page miss request or as a bank miss request depending upon the amount of time between the processing of the request of controller 78 and the request of controller 80.

Each of the eight AND gates 120a–120h of the bank select comparator 108 has two inputs and an output. One input of each AND gate 120a–120h is coupled to a corresponding non-inverting output of the flip-flops 118a–118h. Furthermore, the other input of each AND gate 120a–120h is coupled to a corresponding bit 124a–124h of the bank select of the request at the head 66 of the queue 50. The output of each AND gate 120a–120h is coupled to an input of the eight input OR gate 122. Furthermore, the output of the OR gate 122 is coupled to the hit line 86.

Since in the preferred embodiment only one bit of the bank select has a logical "1" value, only one of the AND gates 120a–120h has a input that is set to a logical "1" value by the outputs of the flip-flops 118a–118h. Likewise, only one of the AND gates 120a–120h has an input that is set to a logical "1" value by the bank select of the request at the head 66 of the queue 50. Since an AND gate only outputs a logical "1" value when all inputs are a logical "1" value, all inputs of the OR gate 122 will be a logical "0" value unless a single one of the AND gates 120a–120h has the one input that was set by the flip-flops to a logical "1" value and the one input that was set to a logical "1" by the bank select of the request at the head 66. Since this condition occurs when the bank select of the request at the head 66 and the present bank select are equal, the output of the OR gate has a logical "1" value only when the request at the head 66 maps to the same bank 30a–30h as the present request and the RAS line 44a–44h for the bank 30a–30h is still asserted. Therefore, the arbiter 54 knows whether the request at the head 66 of the queue 50 is a bank hit request by the logical state of the output of the OR gate 122.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method comprising:
   receiving (1) a bank hit request to access a memory comprising a plurality of banks, wherein the bank hit request corresponds to a same bank of the plurality of banks as a present request to access the memory, and (2) a bank miss request to access the memory, wherein the bank miss request corresponds to a different bank of the plurality of banks as the present request; and
   selecting the bank hit request over the bank miss request for a next request to access said memory if a probability of achieving a performance advantage over the bank miss request from the bank hit request also being a page hit request outweighs a probability of achieving a performance disadvantage over the bank miss request from the bank hit request also being a page miss request.

2. The method of claim 1, wherein:
   the receiving includes receiving the bank hit request and the bank miss request from a plurality of requesting agents that comprise a quantity of requesting agents, and
   the selecting includes selecting the bank hit request for the next request if the quantity of requesting agents is less than a predetermined threshold quantity of requesting agents.

3. The method of claim 1, wherein:
   the receiving includes receiving the bank hit request and the bank miss request from a plurality of requesting agents that comprise a quantity of requesting agents, and
   the selecting includes selecting the bank miss request for the next request if the quantity of requesting agents is greater than a predetermined threshold quantity of requesting agents.

4. The method of claim 1, further comprising:
   setting a present request flag to a first state if the present request was received via a first bus; and
   setting the present request flag to a second state if the present request was received via a second bus;
   wherein:
   the receiving includes receiving the bank hit request via the first bus, and receiving the bank miss request via the second bus, and
   the selecting includes selecting the bank hit request for the next request if the present request flag is set to the first state.

5. The method of claim 1, further comprising setting a mode flag, wherein:
   the selecting includes selecting the bank hit request for the next request if the mode flag is set to a small configuration state.

6. The method of claim 1, further comprising setting a mode flag, wherein:
   the selecting includes selecting the bank miss request for the next request if the mode flag is set to a large configuration state.

7. A memory controller to arbitrate requests to access a memory having a plurality of banks, the memory controller comprising:
   a present bank store having at least one storage element to store a present request, wherein the present request corresponds to one of the plurality of banks and corresponds to one of a plurality of pages of memory within a respective bank of the plurality of banks;
   a first queue having at least one storage element to store a bank hit request, wherein the bank hit request corresponds to a same bank of the plurality of banks as the present request;
   a second queue having at least one storage element to store a bank miss request, wherein the bank miss request corresponds to a different bank of the plurality of banks as the present request; and
   an arbiter coupled to each of (1) said first queue, (2) said second queue, and (3) said present bank store, said arbiter to grant access to said memory to a next request that is selected from said bank hit request and said bank miss request, said arbiter to select the bank hit request over the bank miss request for the next request if a probability of achieving a performance advantage over the bank miss request from the bank hit request also being a page hit request outweighs a probability of achieving a performance disadvantage over the bank miss request from the bank hit request also being a page miss request.

8. The memory controller of claim 7, further comprising a mode flag, wherein:

said arbiter is to select said bank hit request for said next request if said mode flag is set to a small configuration state.

9. The memory controller of claim 7, further comprising an agent store, wherein:

said first queue and said second queue are to receive requests from a plurality of requesting agents that comprise a quantity of requesting agents, said agent store is to store a quantity value indicative of said quantity of requesting agents, and said arbiter is to select said bank hit request for said next request if said quantity value is less than a predetermined threshold value.

10. A computer system, comprising:

a memory having a plurality of banks;

a memory controller coupled to said memory, said memory controller having a first port, a second port, and an arbiter;

a first group of processors comprising at least one processor, each processor of the first group coupled to said first port via a first bus;

a second group of processors comprising at least one processor, each processor of the second group coupled to said second port via a second bus;

wherein said arbiter is to grant access to the memory to a next request that is selected from a bank hit request received from the first group of processors and a bank miss request received from the second group of processors, wherein the bank hit request corresponds to a same bank of the plurality of banks as a present request, and the bank miss request corresponds to a different bank of the plurality of banks as the present request, said arbiter to select the bank hit request over the bank miss request for said next request if a probability of achieving a performance advantage over the bank miss request from the bank hit request also being a page hit request outweighs a probability of achieving a performance disadvantage over the bank miss request from the bank hit request also being a page miss request.

11. The computer of claim 10, further comprising a mode flag, wherein:

said arbiter is to select said bank hit request for said next request if said mode flag is set to a small configuration state.

12. The computer of claim 10, further comprising a present bus flag that indicates from which bus said present request originated, wherein:

said arbiter is to select said bank hit request for said next request if said present bus flag indicates that said present request originated from said first bus.

13. The computer of claim 10, wherein:

said first group of processors and said second group of processors comprise a quantity of processors; and said arbiter is to select said bank hit request for said next request if said quantity of processors is less than a predetermined threshold quantity.

14. The method of claim 1 wherein the probability of achieving the performance advantage and the probability of achieving the performance disadvantage depend on at least one of an access time for the bank miss request, an access time for the page hit request, an access time for the page miss request, and a likelihood that the bank hit request is also the page hit request.

15. The method of claim 14 wherein the likelihood that the bank hit request is also the page hit request depends on at least one of a number of requesting agents, a number of the plurality of banks, a bank size, a page size, a cache size of a requesting agent, and a concurrency of bus ports between the present request and the next request.

16. The method of claim 14 wherein the likelihood that the bank hit request is also the page hit request comprises a ratio of page hit requests to bank hit requests.

17. The method of claim 1 further comprising:

determining the probability of achieving the performance advantage;

determining the probability of achieving the performance disadvantage; and determining if the probability of achieving the performance advantage outweighs the probability of achieving the performance disadvantage.

18. The method of claim 17 wherein:

determining the probability of achieving the performance advantage comprises multiplying an access time for the page hit request and a ratio of page hit requests to bank hit requests to produce a first product;

determining the probability of achieving the performance disadvantage comprises multiplying an access time for the page miss request and a ratio of page miss requests to bank hit requests to produce a second product; and determining if the probability of achieving the performance advantage outweighs the probability of achieving the performance disadvantage comprises adding the first product and the second product to produce a sum, and comparing the sum to an access time for the bank miss request.

* * * * *